UNITED STATES PATENT OFFICE.

GEORGE H. PORTER, OF BRISTOL, CONNECTICUT, ASSIGNOR TO PORTER SAW COMPANY, OF SAME PLACE.

Letters Patent No. 88,585, dated April 6, 1869.

IMPROVED PROCESS OF HARDENING STEEL PLATES, &c.

The Schedule referred to in these Letters Patent and making part of the same.

*To all whom it may concern:*

Be it known that I, GEORGE H. PORTER, of Bristol, in the county of Hartford, and State of Connecticut, have invented a new and useful Improvement in the Process of Straightening Steel Plates; and I do hereby declare that the following is a full, clear, and exact description thereof, which will enable others skilled in the art to use the same.

My invention consists in a process of straightening hardened saws, or plates, by compressing them between clamps, or other levelling-device, immediately after the saws have been hardened in the usual manner, and while they are flexible from the remaining heat received before hardening.

In the vessel containing the hardening-fluid, I arrange two solid metal clamps, which are hinged together at their lower edges. The front plate should be placed at an angle of about forty-five degrees, and fixed stationary, or immovable in the bath. The other plate is provided with a suitable handle, to move it to and from the fixed plate, thus opening and closing the clamps.

The inside surfaces of clamps should be perfectly true, and open sufficient to accommodate the thickness of the metal to be straightened.

When a blade is to be hardened, the clamps are placed wide open, so as to leave the hardening-fluid exposed, and free from obstructions. A saw, or plate of the proper heat is then immersed, and hardened in the ordinary manner.

Immediately after the plate so immersed is hardened, and before it is so cold as to be brittle, the clamps are closed slowly, (so as not to cause the hardening-fluid to overflow,) and the blade is firmly clasped and straightened between the clamps, in which position it is held until nearly cold, when it is removed from the bath in comparatively a level state.

It is possible that, at the time of clamping the plate, the hardening-process is not entirely completed, but it is so nearly so, that the blade requires no further aid from the fluid to finish the hardening-process.

The plates, before they are clamped, are so hard as to resist the touch of a file, and are white-hard, which is the hardest state known in the mechanic arts.

By actual use, I have found that a blade of the hardness described, if hot, is sufficiently flexible to be straightened.

For thick steel, and by closing the plates slowly, very small perforations might possibly be used, but I prefer solid plates, as they are much more effective in straightening.

The only possible advantage of perforations in using my process is, that the clamps might be closed a little quicker without causing the hardening-fluid to overflow.

For very thin steel, perforated plates cannot be used to advantage, as a concave surface on one side, and a convex surface on the other, will be made in front of every perforation on the plate clasped between such clamps.

It is common to temper steel plates, by clamping them between hot metal clamps. Those skilled in the art, are aware that the heated clamps must be made to clamp the plate to be tempered gently, until said plate is heated, as the plate (unless very nearly level) would otherwise be liable to break.

By my invention, I produce a process for straightening hardened steel plates, whereby the plate is so nearly levelled, after it is hardened, and before it leaves the bath, that it can be placed in the ordinary heated tempering-clamps, and immediately rigidly clamped, without danger of breaking the plate. It also comes from the tempering-clamps in a much better condition, than it would if not previously levelled, and, therefore, requires but little, if any, manipulation with straightening-hammer.

I do not claim any process of clamping a plate, when said plate is immersed and hardened, while held in the clamp; but,

What I claim as new, and desire to secure by Letters Patent, is—

The process, herein set forth, of straightening a hardened steel plate, while in the hardening-bath, after the hardening-effect has been produced, and before the flexibility imparted by heat is lost by cooling.

GEO. H. PORTER.

Witnesses:
S. P. NEWELL,
EDW'D W. LOWREY.